United States Patent
Antonczyk et al.

(10) Patent No.: US 10,876,726 B2
(45) Date of Patent: Dec. 29, 2020

(54) AIRCRAFT MIRROR ASSEMBLY

(71) Applicant: Zodiac Cabin Controls GmbH, Hamburg (DE)

(72) Inventors: Volker Antonczyk, Hamburg (DE); Henrik Heine, Hamburg (DE); Lutz Neumann, Hamburg (DE)

(73) Assignee: Zodiac Cabin Controls GmbH, Hamburg (DE)

( * ) Notice: Subject to any disclaimer, the term of this patent is extended or adjusted under 35 U.S.C. 154(b) by 0 days.

(21) Appl. No.: 16/500,235

(22) PCT Filed: Apr. 3, 2018

(86) PCT No.: PCT/IB2018/052296
§ 371 (c)(1),
(2) Date: Oct. 2, 2019

(87) PCT Pub. No.: WO2018/185659
PCT Pub. Date: Oct. 11, 2018

(65) Prior Publication Data
US 2020/0056775 A1    Feb. 20, 2020

Related U.S. Application Data

(60) Provisional application No. 62/480,642, filed on Apr. 3, 2017.

(51) Int. Cl.
*F21V 33/00* (2006.01)
*B64D 11/02* (2006.01)
(Continued)

(52) U.S. Cl.
CPC ............ *F21V 33/004* (2013.01); *B64D 11/02* (2013.01); *B64D 2045/007* (2013.01);
(Continued)

(58) Field of Classification Search
CPC . F21V 33/0041; B64D 11/02; B64D 2203/00; F21Y 2115/12; F21W 2107/30;
(Continued)

(56) References Cited

U.S. PATENT DOCUMENTS

2009/0251920 A1* 10/2009 Kino ...................... B60Q 1/323
362/602
2011/0283577 A1* 11/2011 Cornelissen ............. A47G 1/02
40/582

FOREIGN PATENT DOCUMENTS

JP    2003317520    11/2003
JP    2008145675     6/2008
(Continued)

OTHER PUBLICATIONS

International Patent Application No. PCT/IB2018/052296, Search Report and Written Opinion, dated Jun. 13, 2018.

*Primary Examiner* — Ali Alavi
(74) *Attorney, Agent, or Firm* — Kilpatrick Townsend & Stockton LLP (57) ABSTRACT

An aircraft mirror assembly includes a light source, a front cover, and a light guide. The front cover is semi-transparent, the light source is arranged adjacent to an edge of the light guide, and the light guide is arranged adjacent to the front cover. In various aspects, the front cover includes an illumination zone, and, in an activated configuration, the light guide is configured to direct light from the light source to the illumination zone such that light is directed through the illumination zone. In certain aspects, the front cover includes an indicator, and, in an activated configuration, the light guide is configured to direct light from the light source to the indicator such that the indicator is activated. In various examples, the aircraft mirror assembly is provided with an aircraft cabin assembly positionable in a cabin of an aircraft.

17 Claims, 6 Drawing Sheets

(51) Int. Cl.
    *F21Y 115/10*      (2016.01)
    *F21W 107/30*      (2018.01)
    *F21W 106/00*      (2018.01)
    *B64D 45/00*       (2006.01)

(52) U.S. Cl.
    CPC ..... *B64D 2203/00* (2013.01); *F21W 2106/00* (2018.01); *F21W 2107/30* (2018.01); *F21Y 2115/10* (2016.08)

(58) Field of Classification Search
    CPC ......... F21W 2106/10; B04D 2045/007; B04D 2203/00
    USPC ....................................................... 362/135
    See application file for complete search history.

(56) References Cited

FOREIGN PATENT DOCUMENTS

| | | |
|---|---|---|
| JP | 2010002635 | 1/2010 |
| JP | 2015039560 | 3/2015 |

\* cited by examiner

AIRCRAFT MIRROR ASSEMBLY

REFERENCE TO RELATED APPLICATION

This application claims the benefit of U.S. Provisional Application No. 62/480,642, filed Apr. 3, 2017, and entitled SEMI-TRANSPARENT MIRROR WITH SYMBOLS AND/OR ILLUMINATORS WHICH APPEAR IF BACKGROUND IS ILLUMINATED, the content of which is hereby incorporated by reference in its entirety.

FIELD OF THE INVENTION

This application relates to mirror assemblies, and more particularly to systems and devices for a mirror assembly in an aircraft.

BACKGROUND

Mirror assemblies can be used at various locations in aircraft or other vehicles. Sometimes, mirror assemblies are provided with cabin assemblies for the vehicles (e.g., lavatory assemblies, galley assemblies, and/or other assemblies positionable in a cabin of a vehicle). Oftentimes, the mirror assembly includes a number of individual elements that are difficult to clean, and the elements of the mirror assembly are big and heavy, which may cause delays installing a cabin assembly (e.g., lavatory assembly) in the aircraft. To provide illumination of the mirror, separate illuminators are needed to direct light onto the surface of the mirror. In addition, indicators or other designs (e.g., attendant indicator, Wi-Fi indicator, no smoking indicator, etc.) are not included with the mirror assembly and instead are often provided at other locations, which take up additional space in the cabin.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, an aircraft mirror assembly includes a light source, a semi-transparent front cover, and a light guide. The light source is arranged adjacent to an edge of the light guide. The light guide is arranged adjacent to the front cover. In some examples, the front cover includes at least one illumination zone, and, in an activated configuration, the light guide is configured to direct light from the light source to the illumination zone such that light is directed through the illumination zone of the front cover.

In various examples, the front cover further includes at least one indicator, where, in the activated configuration, the at least one indicator is activated on a front surface of the front cover, and, in a deactivated configuration, the at least one indicator is deactivated on the front surface of the front cover. In some aspects, in the deactivated configuration, the at least one indicator is concealed on the front surface of the front cover. In various cases, the at least one indicator includes a plurality of indicators. In certain aspects, the light source is a first light source, the aircraft mirror assembly includes a second light source, the first light source is paired with the illumination zone, and the second light source is paired with the at least one indicator. According to various examples, the illumination zone and the at least one indicator are independently controllable between the activated configuration and deactivated configuration.

In certain cases, the aircraft mirror assembly further includes a frame and a back cover, the light source is supported on the frame adjacent to an edge of the frame, and the back cover is supported on the frame on a side opposite from the light source. In some aspects, the back cover is semi-transparent, the back cover includes at least one back cover illumination zone, and, in the activated configuration, the light guide is configured to direct light from the light source to the back cover illumination zone such that light is directed through the back cover illumination zone of the back cover.

In some examples, a thickness of the aircraft mirror assembly is less than 1.0 cm.

According to various examples, an aircraft mirror assembly includes a semi-transparent front cover, a light source, and a light guide. The front cover includes a front surface and a back surface, and the front surface of the front cover includes at least one indicator. The light source is arranged adjacent to an edge of the light guide. The light guide is arranged adjacent to the back surface of the front cover. In certain aspects, in an activated configuration, the light guide is configured to direct light from the light source to the indicator such that the indicator is activated, and, in a deactivated configuration, the indicator is concealed on the front surface of the front cover.

In certain cases, the front cover further includes at least one illumination zone, and, in the activated configuration, the light guide is configured to direct light from the light source to the illumination zone such that light is directed through the illumination zone of the front cover. In various examples, a thickness of the aircraft mirror assembly is less than 1.0 cm. According to certain aspects, the front surface of the front cover includes a plurality of indicators. In various cases, each indicator is independently controllable between the activated configuration and the deactivated configuration. In some examples, the aircraft mirror assembly further includes a frame and a back cover. In various aspects, the light source is supported on the frame adjacent to an edge of the frame, and the light guide, frame, and light source are supported between the front cover and the back cover.

According to some examples, an aircraft mirror assembly includes a light emitting diode ("LED") strip with a plurality of LEDs, a light guide, and a front cover. The plurality of LEDs are arranged adjacent to an edge of the light guide. The front cover includes a front surface, a back surface, a semi-transparent material, and at least one indicator. The light guide is configured to direct light from the LEDs to the indicator, and the at least one indicator is revealed on the front surface in an activated configuration and concealed in a deactivated configuration.

In various cases, the aircraft mirror assembly further includes a back cover where the LED strip and light guide are positioned between the front cover and the back cover, and the LED strip is adjacent to an edge of the back cover and an edge of the front cover. In some cases, the back cover includes a semi-transparent material. In various examples, the at least one indicator includes a plurality of indicators, and the light guide is configured to direct light from the LEDs to each indicator. According to certain cases, the at least one indicator includes a plurality of indicators, the light guide is a first light guide and the aircraft mirror assembly further includes a plurality of light guides, and each light guide is associated with a corresponding indicator and is configured to direct light from the LEDs to the corresponding indicator.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "left," "right," "front," and "back," among others, are intended to refer to the orientation as illustrated and described in the figure (or figures) to which the components and directions are referencing. References herein to "consisting of" may, in at least some circumstances, encompass "consisting essentially of" or "comprising."

In some aspects, disclosed is a mirror assembly, including, but not limited to, a mirror assembly for an aircraft. The mirror assembly includes a light source, a light guide, and a front cover. In various examples, the light source is an edge light source such that light is produced from an edge of the mirror assembly. In certain cases, the light source is a LED light strip with a plurality of LEDs, although various other suitable light sources may be utilized. The front cover may include a translucent or semi-transparent material such that light may pass through the front cover. In certain cases, the front cover is a translucent or semi-transparent mirror.

In various examples, the front cover includes one or more illumination zones. The light guide is configured to direct light from the light source to the illumination zones such that the illumination zones are illuminated and/or light can pass through the illumination zones when the light source is activated. When multiple illumination zones are provided, the illumination zones may be controlled jointly or independently.

In various examples, the front cover may include one or more indicators in addition to or in place of the illumination zone(s). The indicators may include various symbols or messages that convey information to a person using the mirror assembly. In some non-limiting examples, the indicators may include a no smoking indicator, a call attendant indicator, a return to seat indicator, a Wi-Fi indicator, a fasten seatbelt indicator, or various other indicators as desired. In various aspects, the light guide is configured to direct light from the light source to the indicators such that the indicators can be activated or deactivated when the light source is activated or deactivated. In various cases, the indicators are activated and visible on a front surface of the front cover in an activated configuration and are concealed and not visible on the front surface of the front cover in a deactivated configuration. In certain cases with a plurality of indicators, one or more indicators may be controlled jointly or independently. When both illumination zones and indicators are present, the illumination zones and indicators may be controlled jointly or independently.

Figure 1:
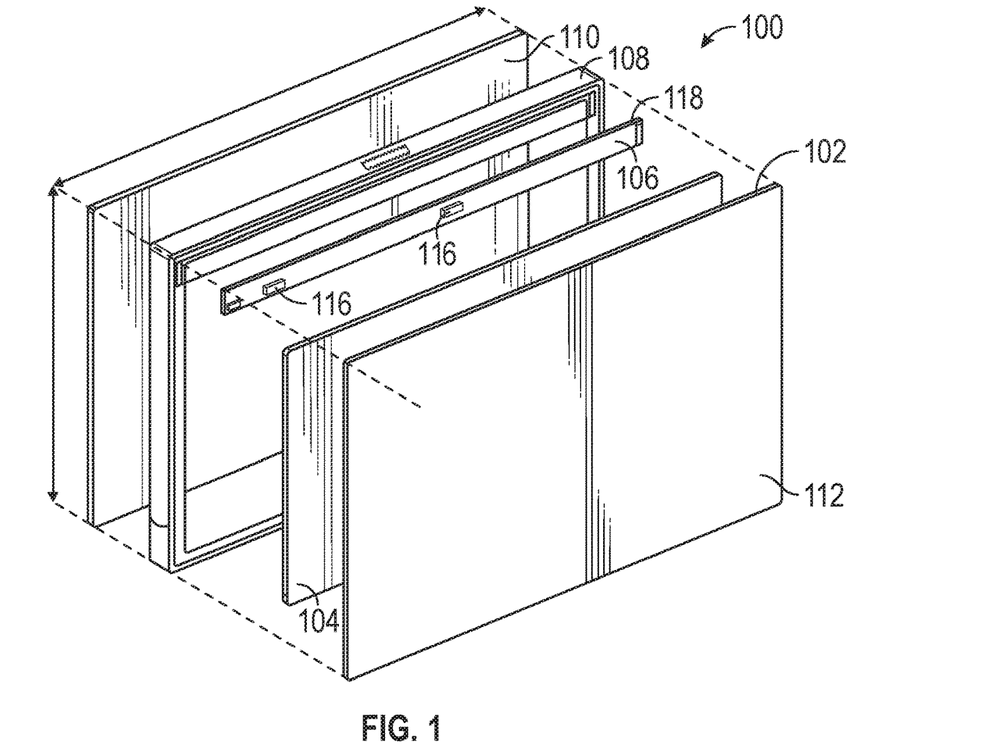
FIG. 1 is an exploded assembly view of a mirror assembly according to aspects of the current disclosure.
Figure 2:
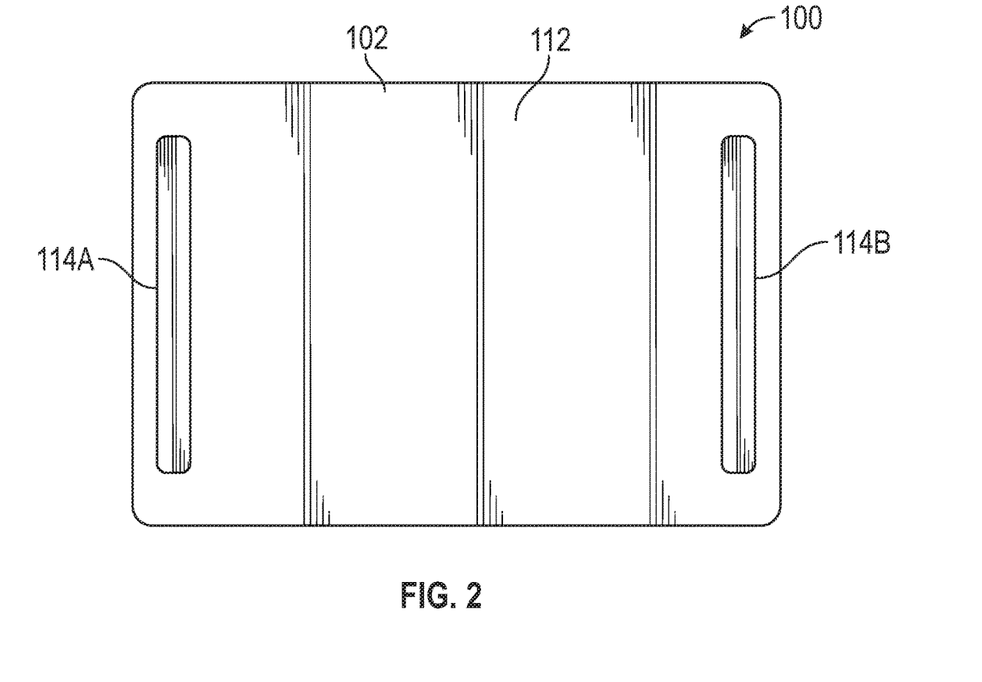
FIG. 2 is a front view of the mirror assembly of FIG. 1 with the mirror assembly in a first configuration.
Figure 3:
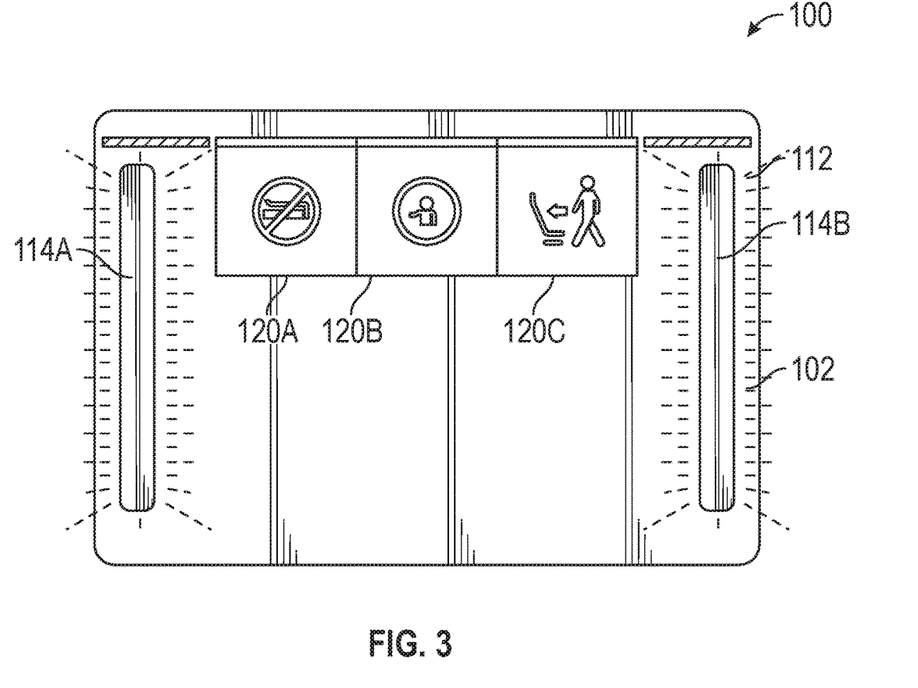
FIG. 3 is a front view of the mirror assembly of FIG. 1 with the mirror assembly in a second configuration.

FIGS. 1-3 illustrate an example of a mirror assembly 100 according to aspects of the present disclosure. In certain examples, the mirror assembly 100 may be provided with various cabin assemblies positionable within a cabin of an aircraft. As one non-limiting example, the mirror assembly 100 may be provided with a lavatory assembly. In other examples, the mirror assembly 100 may be used with other assemblies, may be used with other vehicles, and/or may be provided in other environments or locations.

Referring to FIG. 1, the mirror assembly 100 includes a front cover 102, a light guide 104, and a light source 106. Optionally, the mirror assembly 100 includes a frame 108 and/or a back cover 110.

In various examples, the light source 106 is an edge light source provided at an edge of the light guide 104. Optionally, the light source 106 is provided at an edge of the mirror assembly 100 (see, e.g., FIGS. 1-6), but it need not be in other examples (see, e.g., FIGS. 8-11). Optionally, the light source 106 is supported on the frame 108, although it need not be in other examples. In some examples, the light source 106 is a plurality of light emitted diodes ("LEDs") 116 arranged in any number and/or pattern on a printed circuit board ("PCB") 118 (the combination sometimes referred to as an "LED light strip"). In other examples, light sources other than LEDs 116 may be utilized. The LEDs 116 may be single-die or multi-die LEDs, DC or AC, can be organic light emitting diodes, or can be any combination thereof. White, color, or multicolor LEDs, or any combination thereof, may be used. Moreover, the LEDs 116 need not all be the same color; rather, mixtures of LEDs may be used. In certain examples, a plurality of light sources 106 may be provided and/or the LEDs 116 may be independently controllable relative to other LEDs 116.

The light guide 104 is provided adjacent to the light source 106 and is configured to transport light emitted from the light source 106 to various locations on the front cover 102, such as one or more illumination zones 114 and/or one or more indicators 120, as described in detail below. In some non-limiting examples, the light guide 104 may be constructed from various optical grade materials including, but not limited to, acrylic resin, polycarbonate, epoxies, and glass. In other examples, other materials suitable for directing light from the light source 106 to the front cover 102 may be utilized. In some examples, as described in detail below, more than one light guide 104 may be provided with the assembly 100.

In certain examples, the front cover 102 includes a semi-transparent or translucent material. In various examples, the front cover 102 is a semi-transparent mirrored glass, although in other examples, the front cover 102 may be signage with various graphics or designs, or have various other configurations. The front cover 102 includes a front surface 112 and a back surface (not shown) opposite the front surface 112. In some cases, at least a portion of the front surface 112 may include various designs or graphics such as decorative designs or patterns, a brand logo, etc. In other examples, the designs or graphics or other similar elements may be omitted.

As illustrated in FIGS. 2 and 3, in some examples, the front cover 102 includes at least one illumination zone 114. In the example of FIGS. 2 and 3, the front cover 102 includes two illumination zones 114A-B, although in other examples, no (i.e., zero) illumination zones, one illumination zones, or more than two illumination zones may be provided. The number, size, shape, and/or location of the illumination zones 114 should not be considered limiting on the current disclosure. The illumination zones 114 are configurable between a deactivated configuration (FIG. 2) and an activated configuration (FIG. 3). In the activated configuration, the light guide 104 directs light from the light source 106 to the illumination zones 114 such that the light is directed through the illumination zones 114. In the deactivated configuration, the light source 106 (or a corresponding LED 116 of the light source 106) may be deactivated (e.g., not emitting light), and/or light is not directed through the illumination zones 114. Optionally, the illumination zones 114 are visible on the front surface 112 in both the activated and deactivated configurations, although they need not be in other examples. For example, in some optional cases, the illumination zones 114 may be concealed and/or not visible on the front surface 112 in the deactivated configuration.

In some cases with more than one illumination zone 114, the illumination zones 114 may be jointly or independently controlled between the activated and deactivated configurations. In certain cases where the illumination zones are independently controlled, the mirror assembly 100 may include more than one light source 106 (e.g., a light source dedicated to each illumination zone 114), the mirror assembly 100 may include more than one light guide 104 (e.g., a light guide dedicated to each illumination zone 114), the LEDs 116 may be independently controlled, and/or various other mechanisms may be utilized to independently activate and deactivate the illumination zones 114.

In some examples, the front cover 102 includes at least one indicator 120 (FIG. 3). In the example of FIGS. 1-3, the front cover includes three indicators 120A-C, although in other examples, any number of indicators 120 may be provided including no (i.e., zero) indicators, one indicator, two indicators, or more than three indicators. The number, size, shape, and/or location of the indicators 120 should not be considered limiting on the current disclosure. In some examples, the indicators 120 are provided in addition to the illumination zones 114. In other examples, only indicators 120 may be provided (e.g., the illumination zones 114 are omitted), only the illumination zones 114 are provided (e.g., the indicators 120 are omitted), or neither indicators 120 nor illumination zones 114 are provided. The indicators 120 may include various symbols or messages that optionally convey information to a person using the mirror assembly 100. In some non-limiting examples, the indicators 120 may include a no smoking indicator, a call attendant indicator, a return to seat indicator, a Wi-Fi indicator, a fasten seatbelt indicator, or various other indicators as desired. In the example of FIG. 3, the indicator 120A is a no smoking indicator, the indicator 120B is a call attendant indicator, and the indicator 1200 is a return to seat indicator.

In various aspects, the light guide 104 is configured to selectively direct light from the light source 106 to the indicator(s) 120 such that the indicator(s) can be configured between an activated configuration (FIG. 3) and a deactivated configuration (FIG. 2). Referring to FIG. 3, in the activated configuration, the indicator 120 is activated and visible on the front surface 112 of the front cover 102. In certain examples, in the activated configuration, the light guide 104 directs light from the light source 106 to the indicator 120 such that the indicator 120 is activated and visible on the front surface 112 of the front cover 102. Referring to FIG. 2, in the deactivated configuration, the indicator 120 is deactivated and concealed/not visible on the front surface 112 of the front cover 102. As discussed above, in some cases, in the deactivated configuration, the light source 106 is deactivated and/or various other mechanisms may be provided to disrupt the direction of light from the light source 106 to the indicator 120.

Optionally, where a plurality of indicators 120 are provided, each indicator 120 may be independently controlled through various mechanisms discussed above with respect to the illumination zones 114 such that the indicators 120 are independently configurable between the activated configuration and the deactivated configuration. As one non-limiting example, the indicators 120 may be independently controlled such that the no smoking indicator 120A is activated while the call attendant indicator 120B is deactivated. In other examples, one or more indicators 120 may be jointly controlled. In various cases, the indicators 120 may be controlled jointly or independently with one or more of the illumination zones 114 between the activated and deactivated configurations. In the non-limiting example of FIGS. 2 and 3, each illumination zone 114A-B and each indicator 120A-C is independently controlled by a segment of LEDs 116 of the light source 106 (i.e., the light source 106 has five segments of LEDs 116, one segment for each illumination zone or indicator).

In some non-limiting examples, at least one of the indicators 120 is a selectable indicator that can be selected by the passenger. In such examples, the selectable indicator 120 may include a piezoelectric sensor or other similar switch such that the indicator 120 may be selectable. As one non-limiting example, in FIG. 3, the call attendant indicator 120B is a selectable indicator with a piezoelectric sensor, capacitive sensor, or similar switch. As one non-limiting example, a selectable indicator may include a single-layer, individually configurable capacitive touch sensor with pre-definable touch fields and/or touch points with additional function keys. In this example, the indicator may be laminated behind or on the front cover 102 made of glass, polycarbonate, polyester, or various other suitable materials. In various cases, the selectable indicator 120 may be selected when in the activated configuration. In other examples, a selectable button may be provided at another location relative to the mirror assembly 100 (e.g., on a wall or other suitable location). Upon activation of the selectable button, one or more indicators 120 are activated on the mirror assembly 100 to provide a visual indication that the selectable button was activated.

Optionally, in some examples, the mirror assembly 100 includes the back cover 110. In some examples, the back cover 110 is an opaque material. In one non-limiting example, the back cover 110 may be various metals, composites, plastics, any combination thereof, or various other suitable materials. In various examples, similar to the front cover 102, the back cover 110 may include a semi-transparent or translucent material. In such examples, the back cover 110 optionally includes a back cover illumination zone, a back cover indicator, or any combination thereof. In certain cases, similar to the indicators 120 and illumination zones 114 of the front cover 102, one or more light guides 104 are configured to selectively direct light to the back cover illumination zone and/or back cover indicator such that they are configurable between activated and deactivated configurations.

The frame 108 may optionally support the front cover 102, light guide 104, light source 106, and/or back cover 110. In some examples, various suitable mechanisms may be utilized to support the front cover 102, light guide 104, light source 106, and/or back cover 110 on the frame including, but not limited to, magnets, adhesives, glues, various bonding agents, various mechanical fasteners, or various other suitable mechanisms. In some cases, the frame 108 includes a lightweight material including, but not limited to, various metals (such as aluminum or other metals), composites, plastics, or various other suitable materials.

Optionally, various mounting mechanisms may be provided on the back cover 110 and/or frame 108 such that the mirror assembly 100 may be supported at various locations, including, but not limited to, a lavatory assembly. In various examples, the mirror assembly 100 may be permanently mounted at the various locations or may be removably mounted. In certain cases, the mirror assembly 100 optionally includes one or more connectors with various interfaces to provide power and/or control signals to the different components of the mirror assembly 100. Such connectors may be configured for permanently or temporarily establishing electrical and/or communication connections between the mirror assembly 100 and the location where it is supported.

In various examples, the mirror assembly 100 provides a compact, lightweight assembly that is easy to install and clean due to the reduced number of components. In some examples, the mirror assembly 100 optionally has a thickness of less than about 1.0 cm, such as less than about 30.0 mm. However, in other examples, the thickness may be greater than 1.0 cm as desired. In addition, through the light source, light guide, and front cover, additional or extra light sources may not be required, which may further reduce installation time needed for the mirror assembly 100 (and optionally any associated assemblies in the cabin such as the lavatory assembly). In certain examples, through the mirror assembly 100, information and service buttons (previously unavailable) may be provided to passengers through the indicators on the mirror assembly 100. The mirror assembly 100 also reduces the installation space needed, and as such provides space savings, which may be important in crowded environments such as an aircraft lavatory assembly, and optionally cost savings because fewer components and lighter weight components are utilized.

Figure 4:
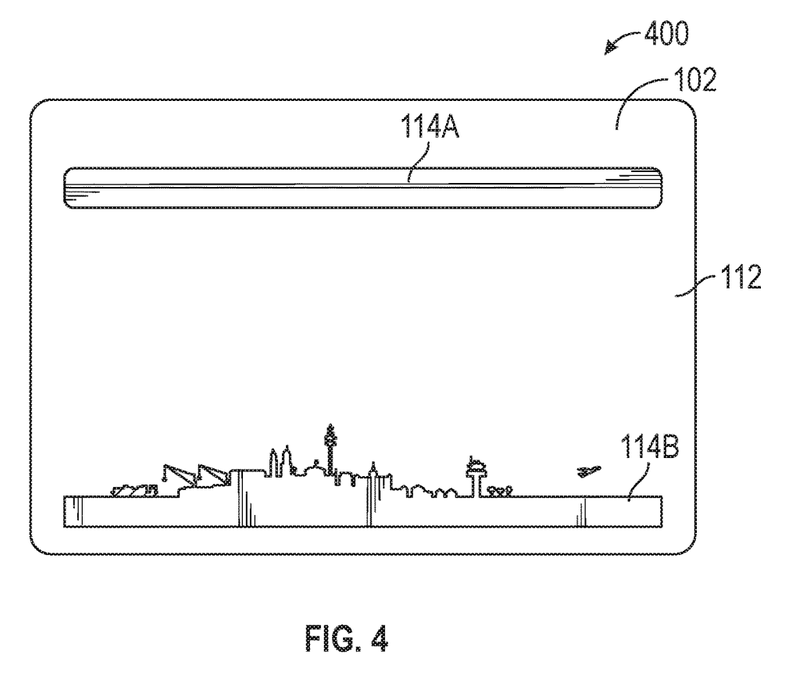
FIG. 4 is a front view of a mirror assembly according to aspects of the present disclosure.

FIG. 4 illustrates another non-limiting example of a mirror assembly 400 in a deactivated configuration. The mirror assembly 400 is substantially similar to the mirror assembly 100 except that the location and shape of the illumination zones 114A-B is changed. As illustrated in FIG. 4, the illumination zone 114A extends substantially across a width of the front cover 102 of the mirror assembly 400. The illumination zone 114B also extends substantially across the width of the front cover 102 like the illumination zone 114A. Compared to the illumination zone 114A of mirror assembly 400, the illumination zone 114E of the mirror assembly 400 has a different shape. In the example of FIG. 4, the illumination zone 114B is shaped with a cityscape.

Figure 5:
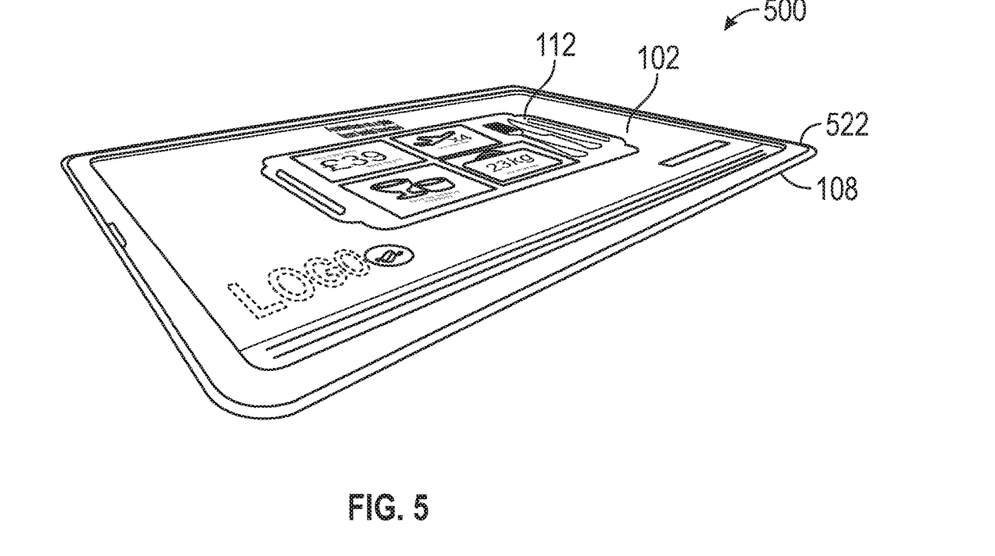
FIG. 5 is a perspective view a mirror assembly according to aspects of the present disclosure.
Figure 6:
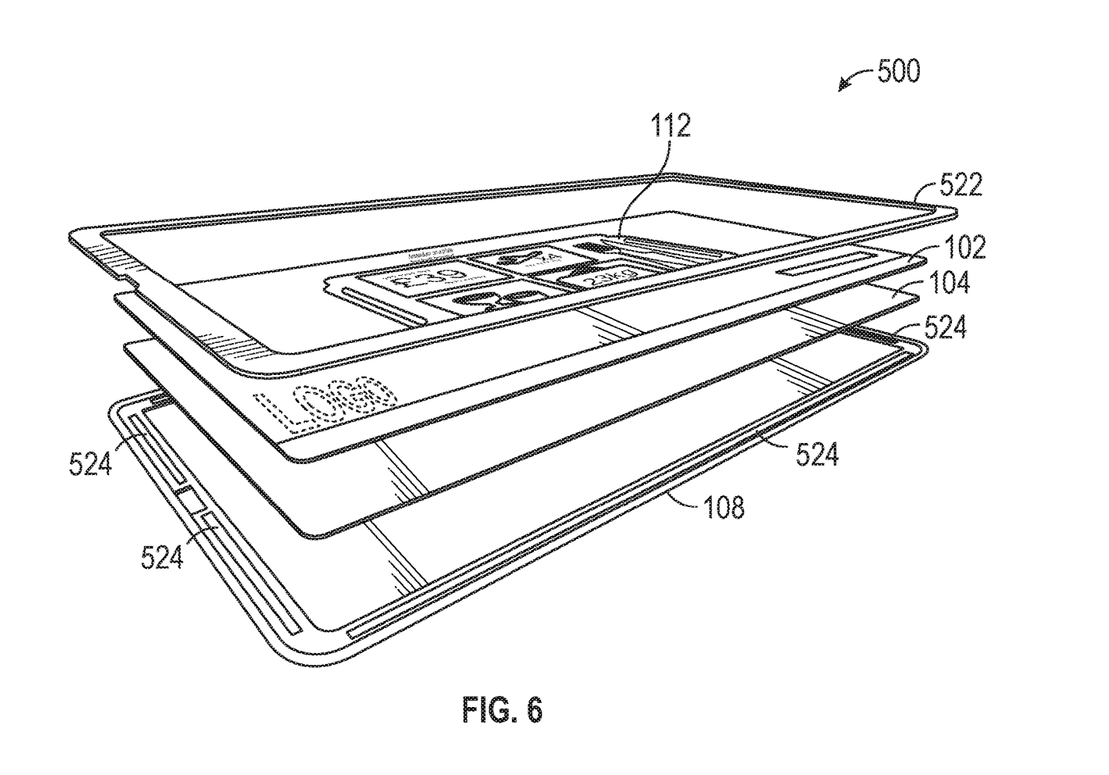
FIG. 6 is an exploded assembly view of the mirror assembly of FIG. 5.

FIGS. 5 and 6 illustrated another example of a mirror assembly 500. The mirror assembly 500 is substantially similar to the mirror assembly 100 except that the mirror assembly 500 further includes a cover plate 522. In certain examples, the cover plate 522 extends around a perimeter of the mirror assembly 500. In some optional examples, the cover plate 522 may provide additional protection for the edges of the mirror assembly 500 and/or optionally provide a uniform edge of the mirror assembly 500. Optionally, as illustrated in FIG. 6, the cover plate 522 may be supported on the frame 108 through magnets 524; however, in other examples, various other mechanisms may be utilized to support the cover plate 522 on the frame 108.

Figure 7:
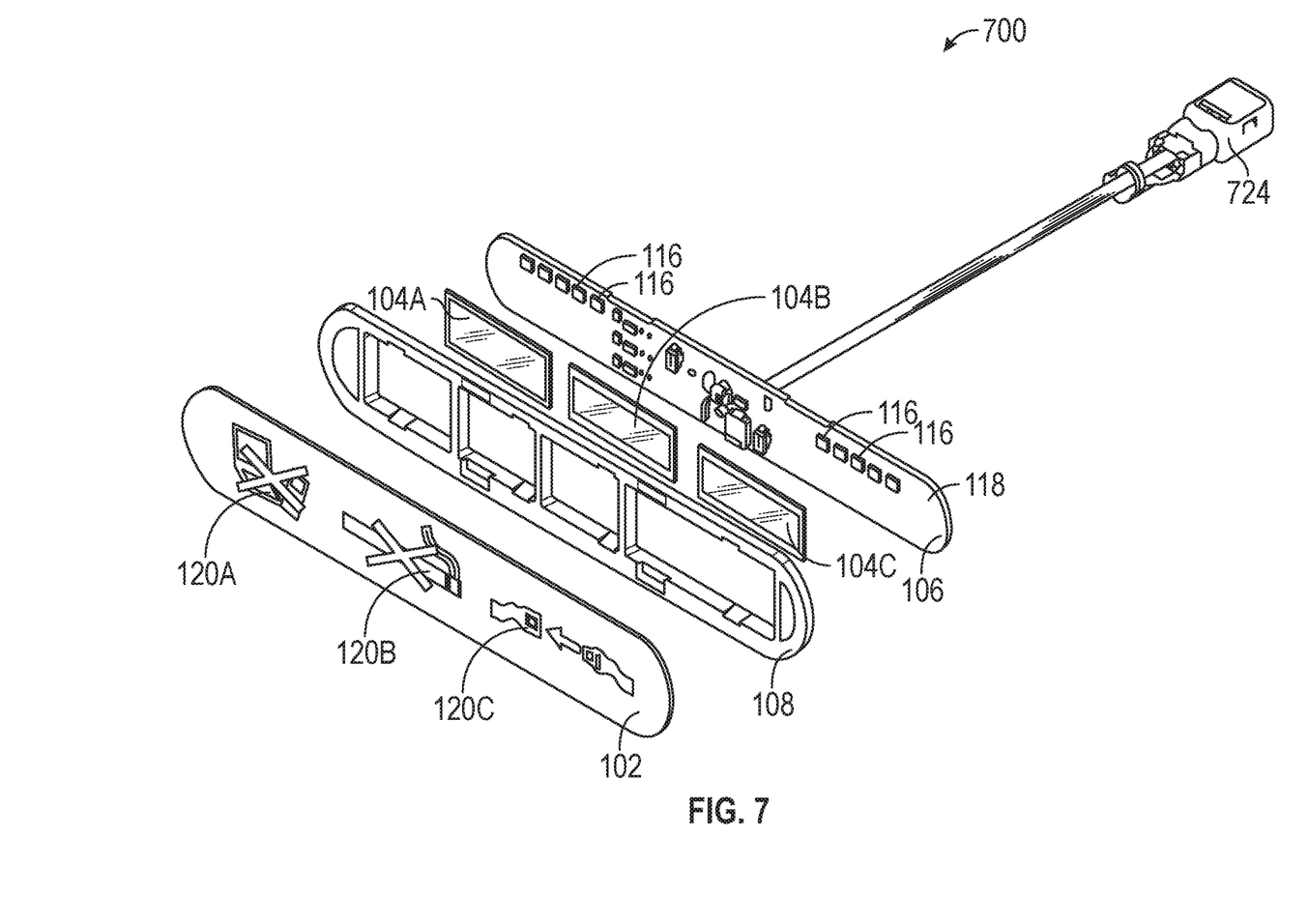
FIG. 7 is an exploded assembly view of a mirror assembly according to aspects of the present disclosure.

FIG. 7 illustrates another example of an assembly 700. Compared to the mirror assembly 100, the assembly 700 only includes the indicators 120A-C. As illustrated in FIG. 7, in some examples, the assembly 700 includes a plurality of light guides 104A-C such that each indicator 120A-C has a corresponding light guide 104A-C. In some optional examples, a connector 724 may be provided such that the assembly 700 can establish electrical and/or communication connections with various other devices. Optionally, in the assembly 700, the front cover 102 is not mirrored but is a semi-transparent material with the indicators 120A-C. In such examples, the assembly 700 may be a sign and may be provided at other locations within an aircraft (or various other locations). As one non-limiting example, the assembly 700 is a passenger service unit ("PSU") signage assembly 700 for an aircraft or other vehicle.

FIGS. 8-11 illustrate another non-limiting example of a mirror assembly 800. The mirror assembly 800 may be provided with various assemblies, such as various assemblies for an aircraft (e.g., lavatory assembly, galley assembly, PSU, etc.). Additionally, it will be appreciated that the mirror assembly 800 may have various other configurations and/or components, and the mirror assembly 800 should not be considered limiting on the current disclosure.

Figure 8:
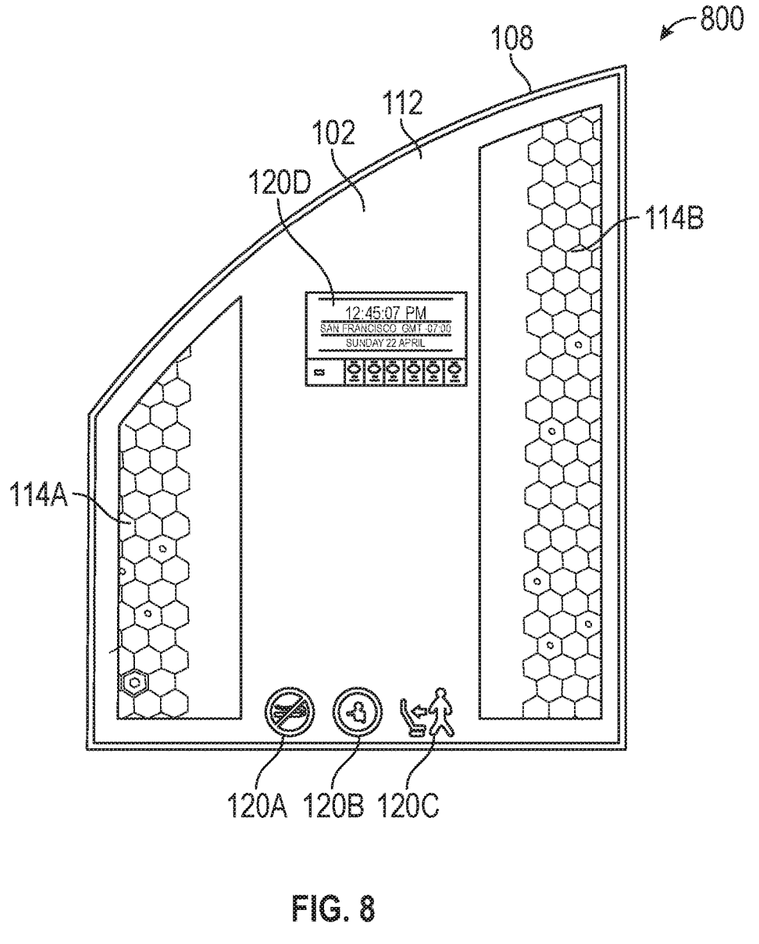
FIG. 8 is a front view of a mirror assembly according to aspects of the present disclosure.
Figure 9:
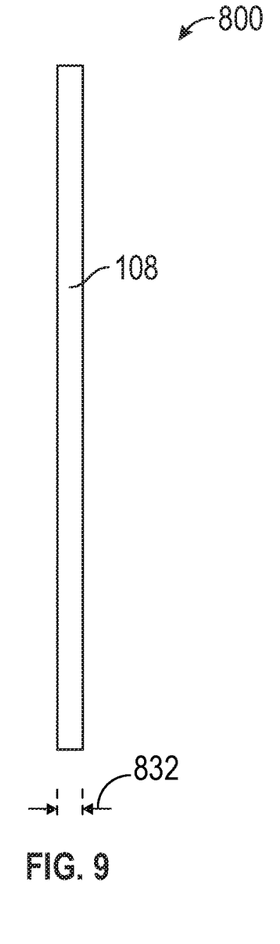
FIG. 9 is a side view of the mirror assembly of FIG. 8.

As illustrated in FIGS. 8-11, similar to the mirror assembly 100, the mirror assembly 800 includes the front cover 102, the frame 108, and the back cover 110. Compared to the mirror assembly 100, a shape of the front cover 102, frame 108, and back cover 110 of the mirror assembly 800 is different, although it need not be. In certain examples, the frame 108 includes a number of frame segments removably secured together such that components of the mirror assembly 100 housed between the front cover 102 and the back cover 110 can be accessed (e.g., for repair or replacement) without disassembling the entire mirror assembly 800. In the non-limiting example of FIGS. 8-11, the frame 108 optionally includes four frame segments: a top frame segment, a bottom frame segment, and two side frame segments. In other examples, any desired number of frame segments may be provided including, but not limited to, one frame segment, two frame segments, three frame segments, or more than four frame segments. As illustrated in FIG. 9, the mirror assembly 800 has a mirror assembly width 823. In various examples, the mirror assembly width 823 is optionally less than about 1.0 cm, such as less than about 30.0 mm. However, in other examples, the mirror assembly width 823 may be greater than 1.0 cm as desired.

Figure 10:
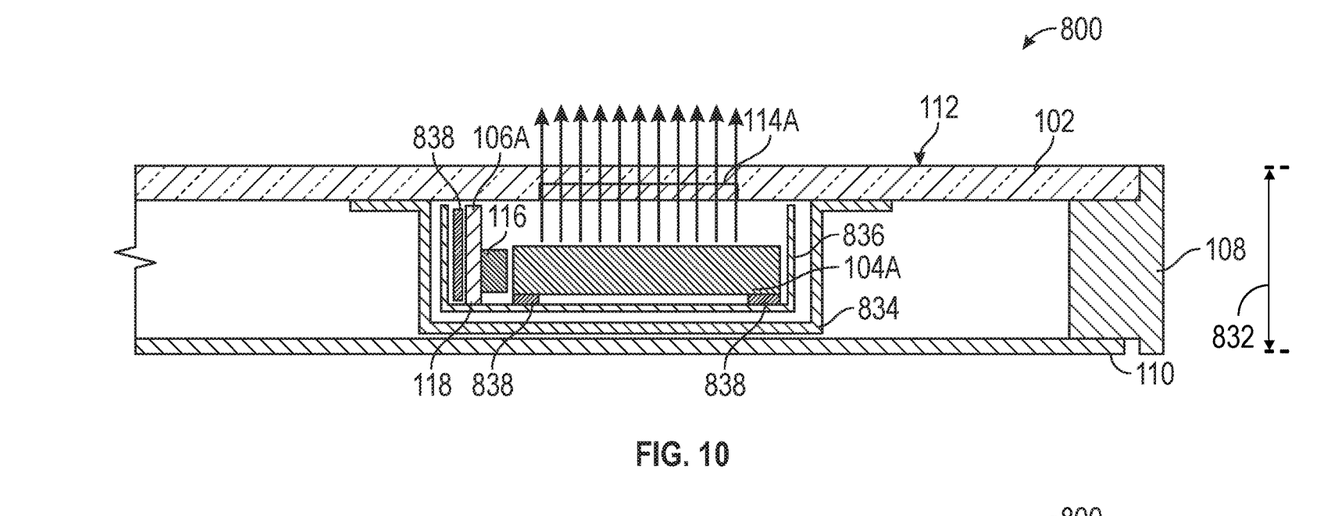
FIG. 10 is a sectional view of a portion of the mirror assembly of FIG. 8.
Figure 11:
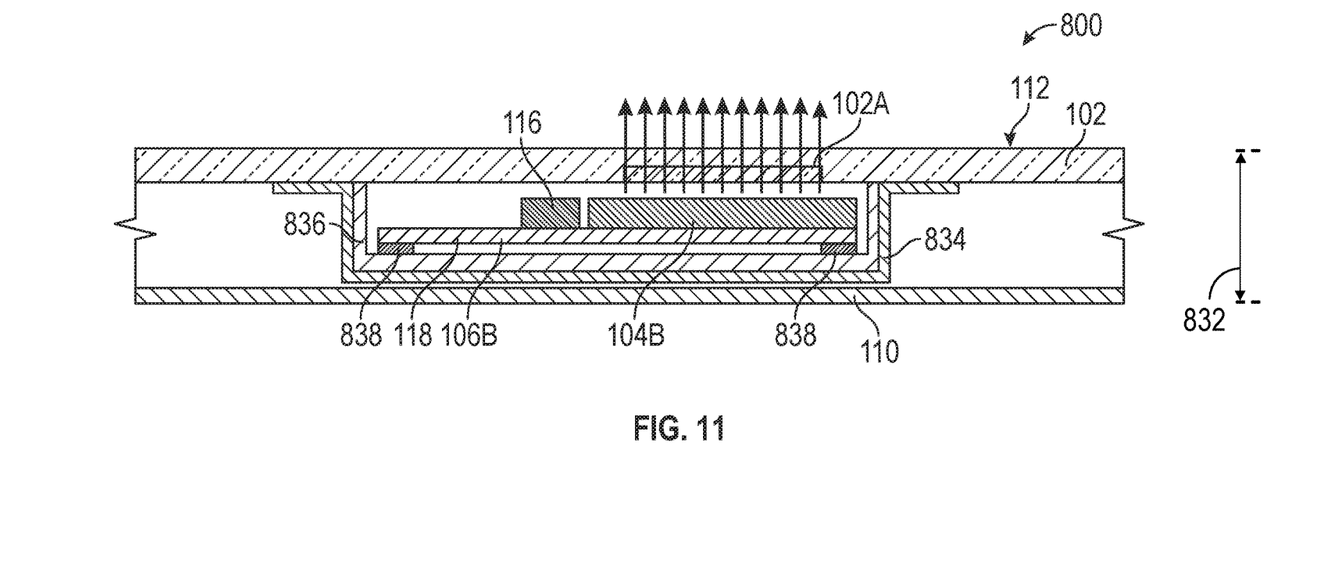
FIG. 11 is a sectional view of another portion of the mirror assembly of FIG. 8.

Similar to the mirror assembly 100, the mirror assembly 800 includes illumination zones 114A-B and indicators 120A-D. Compared to the illumination zones 114A-B of the mirror assembly 100, the illumination zones 114A-B of the mirror assembly 800 include a pattern such that light passing through the illumination zones in the active configuration forms a visual pattern. In various aspects, each illumination zone 114 and indicator includes a dedicated light source 106 and light guide 104. For example, FIG. 10 illustrates a light source 106A and a light guide 104A for the illumination zone 114A. In this example, the light guide 104A is configured to direct light from the light source 106A to the illumination zone 114A in the activated configuration. FIG. 11 illustrates another light source 106B and another light guide 104B for the indicator 120A. In this example, the light guide 104B is configured to direct light from the light source 106B to the indicator 120A in the activated configuration. As illustrated in FIGS. 10 and 11, the light sources 106 are provided at edges of the illumination zone or indicator (and thus at the edge of the light guides 104).

As illustrated in FIGS. 10 and 11, in various aspects, isolators 834 may be provided for each portion of the mirror assembly 800 corresponding to an illumination zone or indicator. The isolators 834 are "light tight" to the front cover 102, meaning that they limit or prevent light from being transmitted or reflected outside of the isolators 834 except through the illumination zone or indicator. Through the isolators 834, the influence of light emitted from a light source within the isolator 834 on other illumination zones or indicators is reduced or eliminated, and each illumination zone or indicator is only influenced by its corresponding light source. As one non-limiting example, through the isolators 834, the light generated by the light source 106A may be limited to only activate the illumination zone 114A, and the light from the light source 106A does not activate the indicator 120A. Conversely, through the isolators 834, the light generated by the light source 106B may be limited to only activate the indicator 120A, and the light from the light source 106B does not activate the illumination zone 114A. In certain examples, the isolators 834 may be inserts provided with the mirror assembly 800. In other examples, the isolators 834 may be attached to the front cover 102 through various suitable attachment mechanisms.

In some examples with the isolators 834, support frames 836 may be utilized to support the light sources 106 and light guides 104 within the isolators 834. Various suitable securing mechanisms described previously may be utilized to secure the light sources 106 and/or light guides 104 to the support frames 836 as well as to secure the support frames 836 to the isolators 834. In the example of FIGS. 10 and 11, the securing mechanisms include adhesive tape 838.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. An aircraft mirror assembly comprising: a light source; a front cover, wherein the front cover is semi-transparent; and a light guide arranged adjacent to the front cover, wherein the light source is arranged adjacent to an edge of the light guide, and wherein the front cover comprises at least one illumination zone, and wherein, in an activated configuration, the light guide is configured to direct light from the light source to the illumination zone such that light is directed through the illumination zone of the front cover.

EC 2. The aircraft mirror assembly of any of the preceding or subsequent example combinations, wherein the front cover further comprises at least one indicator, wherein, in an activated configuration, the at least one indicator is activated on a front surface of the front cover, and wherein, in a deactivated configuration, the at least one indicator is deactivated on the front surface of the front cover.

EC 3. The aircraft mirror assembly of any of the preceding or subsequent example combinations, wherein, in the deactivated configuration, the at least one indicator is concealed on the front surface of the front cover.

EC 4. The aircraft mirror assembly of any of the preceding or subsequent example combinations, wherein the at least one indicator comprises a plurality of indicators.

EC 5. The aircraft mirror assembly of any of the preceding or subsequent example combinations, wherein the light source is a first light source, wherein the aircraft mirror assembly comprises a second light source, wherein the first light source is paired with the at least one illumination zone, and wherein the second light source is paired with the at least one indicator.

EC 6. The aircraft mirror assembly of any of the preceding or subsequent example combinations, wherein the illumination zone and the at least one indicator are independently controllable between an activated configuration and a deactivated configuration.

EC 7. The aircraft mirror assembly of any of the preceding or subsequent example combinations, further comprising a frame and a back cover, wherein the light source is supported on the frame adjacent to an edge of the frame, and wherein the back cover is supported on the frame on a side opposite from the light source.

EC 8. The aircraft mirror assembly of any of the preceding or subsequent example combinations, wherein the back cover is semi-transparent, wherein the back cover comprises at least one back cover illumination zone, and wherein, in the activated configuration, the light guide is configured to direct light from the light source to the back cover illumination zone such that light is directed through the back cover illumination zone of the back cover.

EC 9. The aircraft mirror assembly of any of the preceding or subsequent example combinations, wherein a thickness of the aircraft mirror assembly is less than 1.0 cm.

EC 10. An aircraft mirror assembly comprising: a front cover comprising a front surface and a back surface, wherein the front surface of the front cover comprises at least one indicator and wherein the front cover is semi-transparent; a light source; and a light guide adjacent to the back surface of the front cover, wherein the light source is arranged adjacent to an edge of the light guide, wherein, in an activated configuration, the light guide is configured to direct light from the light source to the indicator such that the indicator is activated, and wherein, in a deactivated configuration, the indicator is concealed on the front surface of the front cover.

EC 11. The aircraft mirror assembly of any of the preceding or subsequent example combinations, wherein the front cover further comprises at least one illumination zone, wherein, in an activated configuration, the light guide is configured to direct light from the light source to the at least one illumination zone such that light is directed through the at least one illumination zone of the front cover.

EC 12. The aircraft mirror assembly of any of the preceding or subsequent example combinations, wherein a thickness of the aircraft mirror assembly is less than 1.0 cm.

EC 13. The aircraft mirror assembly of any of the preceding or subsequent example combinations, wherein the front surface of the front cover comprises a plurality of indicators.

EC 14. The aircraft mirror assembly of any of the preceding or subsequent example combinations, wherein each indicator of the plurality of indicators is independently controllable between the activated configuration and the deactivated configuration.

EC 15. The aircraft mirror assembly of any of the preceding or subsequent example combinations, further comprising a frame and a back cover, wherein the light source is supported on the frame adjacent to an edge of the frame, and wherein the light guide, frame, and light source are supported between the front cover and the back cover.

EC 16. An aircraft mirror assembly comprising: a light emitting diode ("LED") strip comprising a plurality of LEDs; a light guide, wherein the plurality of LEDs are arranged adjacent to an edge of the light guide; and a front cover comprising a front surface and a back surface, wherein the front cover comprises a semi-transparent material and at least one indicator, wherein the light guide is configured to direct light from the LEDs to the at least one indicator, and wherein the at least one indicator is revealed on the front surface in an activated configuration and concealed in a deactivated configuration.

EC 17. The aircraft mirror assembly of any of the preceding or subsequent example combinations, further comprising a back cover, wherein the LED strip and light guide are positioned between the front cover and the back cover, and wherein the LED strip is adjacent to an edge of the back cover and an edge of the front cover.

EC 18. The aircraft mirror assembly of any of the preceding or subsequent example combinations, wherein the back cover comprises a semi-transparent material.

EC 19. The aircraft mirror assembly of any of the preceding or subsequent example combinations, wherein the at least one indicator comprises a plurality of indicators, and wherein the light guide is configured to direct light from the LEDs to each indicator of the plurality of indicators.

EC 20. The aircraft mirror assembly of any of the preceding or subsequent example combinations, wherein the at least one indicator comprises a plurality of indicators, wherein the light guide is a first light guide and the aircraft mirror assembly further comprises a plurality of light guides, and wherein each light guide of the plurality of light guides is associated with a corresponding indicator of the plurality of indicators and is configured to direct light from the plurality of LEDs to the corresponding indicator.

EC 21. An aircraft assembly comprising a mirror assembly comprising: a light source; a light guide, wherein the light source is arranged adjacent to an edge of the light guide; and a front cover comprising at least one of an indicator or an illumination zone and wherein the front cover is semi-transparent, wherein the light guide is configured to direct light from the light source to the indicator or illumination zone in an activated configuration.

EC 22. The aircraft assembly of any of the preceding or subsequent example combinations, wherein the aircraft assembly is a lavatory assembly.

EC 23. The aircraft assembly of any of the preceding or subsequent example combinations, wherein the lavatory assembly further comprises at least one of a base, a dispenser, or a sink.

EC 24. The aircraft assembly of any of the preceding or subsequent example combinations, wherein the mirror assembly comprises the indicator, and wherein the indicator is revealed on the front surface in an activated configuration and concealed in a deactivated configuration.

EC 25. The aircraft assembly of any of the preceding or subsequent example combinations, wherein the mirror assembly comprises the illumination zone, and wherein, in the activated configuration, the light guide is configured to direct light from the light source to the illumination zone such that light is directed through the illumination zone of the front cover.

EC 26. The aircraft assembly of any of the preceding or subsequent example combinations, wherein the illumination zone is visible on a front surface of the front cover in the activated configuration and in a deactivated configuration.

EC 27. The aircraft assembly of any of the preceding or subsequent example combinations, wherein the light source comprises a plurality of LEDs.

EC 28. The aircraft assembly of any of the preceding or subsequent example combinations, wherein the mirror assembly further comprises an isolator surrounding the light source and the light guide.

EC 29. The aircraft assembly of any of the preceding or subsequent example combinations, wherein the isolator is a first isolator, the light source is a first light source, and the light guide is a first light guide, and wherein the aircraft assembly further comprises a second isolator surrounding a second light source and a second light guide.

EC 30. The aircraft assembly of any of the preceding or subsequent example combinations, wherein the isolator is positioned against a back surface of the front cover.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. An aircraft mirror assembly comprising:
   a light source;

a front cover, wherein the front cover is semi-transparent; and a light guide arranged adjacent to the front cover, wherein the light source is arranged adjacent to an edge of the light guide, wherein the front cover comprises at least one illumination zone, and, in an activated configuration, the light guide is configured to direct light from the light source to the illumination zone such that light is directed through the illumination zone of the front cover, wherein the front cover further comprises at least one indicator controllable between an activated configuration and a deactivated configuration, wherein, in the activated configuration, the at least one indicator is activated on a front surface of the front cover, and wherein, in the deactivated configuration, the at least one indicator is deactivated and concealed on the front surface of the front cover.

2. The aircraft mirror assembly of claim 1, further comprising a frame and a back cover, wherein the light source is supported on the frame adjacent to an edge of the frame, and wherein the back cover is supported on the frame on a side opposite from the light source.

3. The aircraft mirror assembly of claim 2, wherein the back cover is semi-transparent, wherein the back cover comprises at least one back cover illumination zone, and wherein, in an activated configuration, the light guide is configured to direct light from the light source to the back cover illumination zone such that light is directed through the back cover illumination zone of the back cover.

4. The aircraft mirror assembly of claim 1, wherein the at least one indicator comprises a plurality of indicators.

5. The aircraft mirror assembly of claim 1, wherein the light source is a first light source, wherein the aircraft mirror assembly comprises a second light source, wherein the first light source is paired with the at least one illumination zone, and wherein the second light source is paired with the at least one indicator.

6. The aircraft mirror assembly of claim 1, wherein the at least one illumination zone is controllable between the activated configuration and a deactivated configuration, and wherein the at least one illumination zone and the at least one indicator are independently controllable between the activated configuration and the deactivated configuration.

7. The aircraft mirror assembly of claim 1, wherein the light source comprises a light emitting diode ("LED") strip comprising a plurality of LEDs.

8. An aircraft mirror assembly comprising:
a front cover comprising a front surface and a back surface, wherein the front surface of the front cover comprises at least one indicator and wherein the front cover is semi-transparent;
a light source; and
a light guide adjacent to the back surface of the front cover,
wherein the light source is arranged adjacent to an edge of the light guide,
wherein the at least one indicator is controllable between an activated configuration and a deactivated configuration, wherein, in the activated configuration, the light guide is configured to direct light from the light source to the indicator such that the indicator is activated on the front surface of the front cover, and wherein, in the deactivated configuration, the indicator is deactivated and concealed on the front surface of the front cover, and wherein the front cover further comprises at least one illumination zone, wherein, in an activated configuration, the light guide is configured to direct light from the light source to the at least one illumination zone such that light is directed through the at least one illumination zone of the front cover.

9. The aircraft mirror assembly of claim 8, wherein the front surface of the front cover comprises a plurality of indicators.

10. The aircraft mirror assembly of claim 9, wherein each indicator of the plurality of indicators is independently controllable between the activated configuration and the deactivated configuration.

11. The aircraft mirror assembly of claim 8, further comprising a frame and a back cover, wherein the light source is supported on the frame adjacent to an edge of the frame, and wherein the light guide, frame, and light source are supported between the front cover and the back cover.

12. The aircraft mirror assembly of claim 8, wherein the light source comprises a light emitting diode ("LED") strip comprising a plurality of LEDs.

13. An aircraft mirror assembly comprising:
a light emitting diode ("LED") strip comprising a plurality of LEDs;
a light guide, wherein the plurality of LEDs are arranged adjacent to an edge of the light guide; and
a front cover comprising a front surface and a back surface, wherein the front cover comprises a semi-transparent material, at least one illumination zone, and at least one indicator,
wherein the light guide is configured to selectively direct light from the LEDs to the at least one indicator and the at least one illumination zone,
wherein, in an activated configuration, the light guide is configured to direct light from the LEDs to the illumination zone such that light is directed through the illumination zone of the front cover,
wherein the indicator is controllable between an activated configuration and a deactivated configuration, wherein, in the activated configuration, the at least one indicator is activated and revealed on the front surface of the front cover, and wherein, in the deactivated configuration, the at least one indicator is deactivated and concealed on the front surface of the front cover.

14. The aircraft mirror assembly of claim 13, further comprising a back cover, wherein the LED strip and light guide are positioned between the front cover and the back cover, and wherein the LED strip is adjacent to an edge of the back cover and an edge of the front cover.

15. The aircraft mirror assembly of claim 14, wherein the back cover comprises a semi-transparent material.

16. The aircraft mirror assembly of claim 13, wherein the at least one indicator comprises a plurality of indicators, and wherein the light guide is configured to direct light from the LEDs to each indicator of the plurality of indicators.

17. The aircraft mirror assembly of claim 13, wherein the at least one indicator comprises a plurality of indicators, wherein the light guide is a first light guide and the aircraft mirror assembly further comprises a plurality of light guides, and wherein each light guide of the plurality of light guides is associated with a corresponding indicator of the plurality of indicators and is configured to direct light from the plurality of LEDs to the corresponding indicator.

* * * * *